United States Patent Office 3,704,247
Patented Nov. 28, 1972

3,704,247
METHOD FOR SYNTHESIZING FISH-KILLING
SUBSTANCES, AND FISH KILLERS
Katsura Munakata, % Department of Agricultural Chemistry, Faculty of Agriculture, Nagoya University, 1 Furocho, Chikusa-ku, Nagoya, Japan
No Drawing. Original application Mar. 28, 1968, Ser. No. 717,037. Divided and this application Nov. 23, 1970, Ser. No. 92,143
Claims priority, application Japan, Mar. 30, 1967, 42/20,186
Int. Cl. C07d 13/10
U.S. Cl. 260—340.5
2 Claims

ABSTRACT OF THE DISCLOSURE

A fish-killing active substance contained in *Justicia Hayatai* var. *decumbens* which is denominated as Justicidin B, i.e. 4-(3',4'-methylenedioxyphenyl)-6,7-dimethoxy-2-hydroxymethyl-3-naphthoic acid lactone, is synthesized by condensing α-acetyl-γ-(3,4-dimethoxybenzyl)-γ-butyrolactone with 3,4-methylenedioxybenzoyl chloride, deacetylating the resulting corresponding α-acetyl-α-(3,4-methylenedioxybenzoyl)-γ-butyrolactone, treating the resulting deacetylation compound, that is α-(3,4-methylenedioxybenzoyl)-γ-butyrolactone, with hydrogen chloride-saturated methanol, and then reacting the resulting compound with potassium bisulfate to obtain a 1,2-dihydro-6,7-dimethoxy-4-(3',4'-methylenedioxyphenyl)-2-hydroxymethyl-1,2-dihydro-3-naphthoic acid lactone, followed by dehydrogenation. The TLm of the present compound toward *Oryzias latipes* is 0.028 p.p.m., and the dihydro compound also shows a marked fish-killing activity.

This application is a division of my co-pending application, Ser. No. 717,037, filed Mar. 28, 1968, now abandoned.

This invention relates to a novel method for preparing the fish-killnig substance Justicidin B. More particularly, the invention pertains to a novel method for the chemical synthesis of Justicidin B, a fish-killing active component of *Justicia Hayatai* var. *decumbens*, and to fish killers containing Justicidin B.

*Justicia Hayatai* var. *decumbens* is an annual plant belonging to the family Acanthaceae. It germinates in May to June, grows to a height of about 40 cm., and comes to have purple, lipped flowers. This plant has been used as such for fishery by natives of Pung Fu Islands of Formosa since such old times as three hundred years ago. This fact suggested that a substance having a strong fish-killing activity would be contained in said plant.

The present inventor was already sucessful in isolating in pure form from *Justicia Hayatai* var. *decumbens* 2 fish-killing substances which were denominated as Justicidin A and B.

As the result of various studies on Justicidin B, the present inventor has determined the chemical structure thereof and has found a novel method the synthesis thereof.

Justicidin B is a compound represented by the following formula:

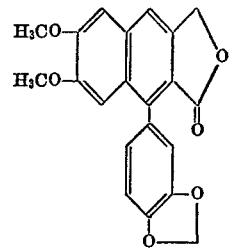

Justicidin B (IX)

[4-(3',4'-methylenedioxyphenyl)-6,7-dimethoxy-2-hydroxymethyl-3-naphthoic acid lactone]

Justicidin B shows a strong fish-killing activity comparable to that of rotenone but is quite characteristic in that it has no appreciable activity on mice and insects.

An object of the present invention is to provide a novel method for synthesizing Justicidin B.

Another object is to provide fish killers containing synthetic Justicidin B.

A further object is to provide a method for synthesizing dihydro compounds of Justicidin B.

A still further object is to provide fish killers containing dihydro compounds of Justicidin B.

Other objects will be apparent from the following description.

In accordance with the present invention, Justicidin B, i.e. 4-(3',4'-methylenedioxyphenyl)-6,7-dimethoxy-2-hydroxymethyl-3-naphthoic acid lactone represented by the Formula IX, is prepared by reacting 6,7-dimethoxy-4-(3',4'-methylenedioxyphenyl)-2-hydroxymethyl-1,2-dihydro-3-naphthoic acid lactone of the formula:

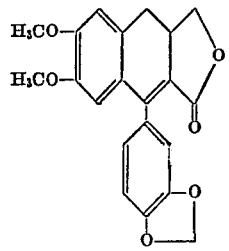

(VIII)

with a dehydrogenation agent such as lead tetraacetate or periodic acid.

The compound (VIII) employed in the above is a novel compound which also has an excellent fish-killing activity, and is synthesized in accordance with the present invention by reacting α-acetyl-γ-(3,4-dimethoxybenzyl)-γ-butyrolactone represented by the formula:

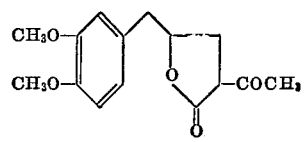

(III)

with a 3,4-methylenedioxybenzoyl halide to form α-acetyl-α - (3,4 - methylenedioxybenzoyl) - γ - (3,4 - dimethoxybenzyl)-γ-butyrolactone represented by the formula:

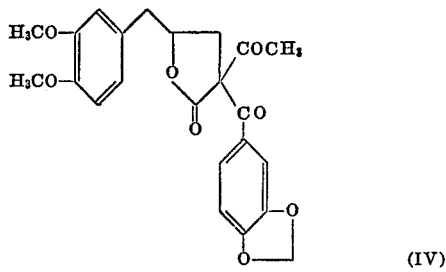

(IV)

deacetylating by contacting the thus formed compound with sodium ethoxide to obtain α-(3,4-methylenedioxybenzoyl)-γ-(3,4 - dimethoxybenzyl)-γ-butyrolactone represented by the formula:

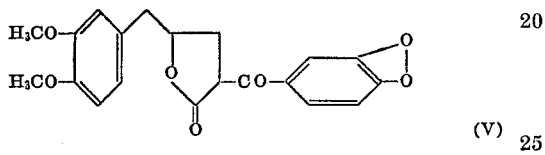

(V)

reacting the thus obtained compound with hydrogen chloride-saturated methyl alcohol to obtain a compound having a melting point of 132° C., and then reacting the thus obtained compound with an alkali metal bisulfate.

It is believed that the chemical structure of the compound having a melting point of 132° C. which is formed in the above synthesis process is

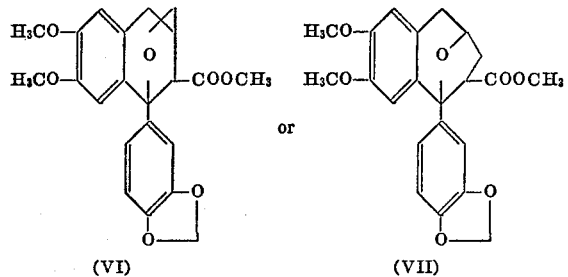

(VI)    (VII)

Further, the compound of the Formula III is readily synthesized by the oxidation of methyleugenol.

According to the present method, the compounds of the present invention are synthesized, for example, through the course as shown below.

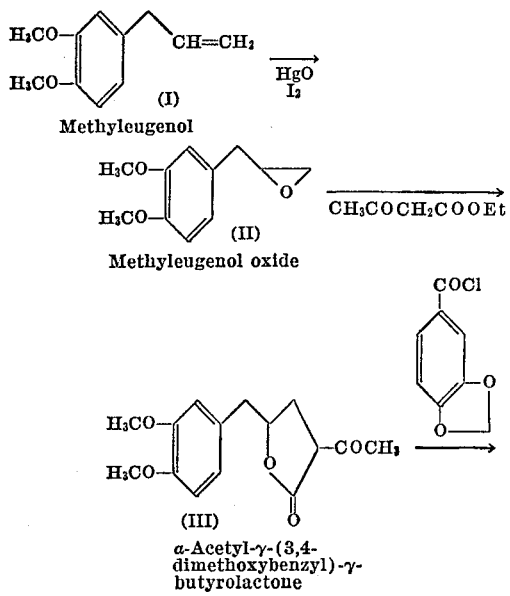

(I) Methyleugenol (II) Methyleugenol oxide (III) α-Acetyl-γ-(3,4-dimethoxybenzyl)-γ-butyrolactone

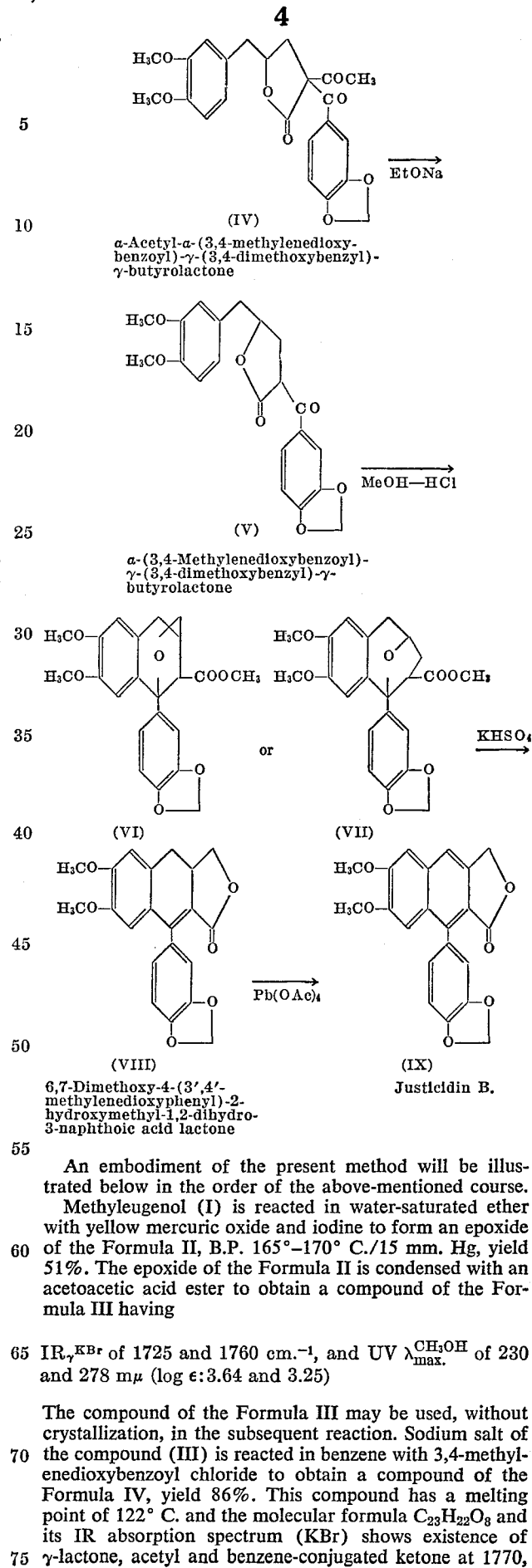

(IV) α-Acetyl-α-(3,4-methylenedioxybenzoyl)-γ-(3,4-dimethoxybenzyl)-γ-butyrolactone (V) α-(3,4-Methylenedioxybenzoyl)-γ-(3,4-dimethoxybenzyl)-γ-butyrolactone (VI)    or    (VII)

(VIII) 6,7-Dimethoxy-4-(3',4'-methylenedioxyphenyl)-2-hydroxymethyl-1,2-dihydro-3-naphthoic acid lactone (IX) Justicidin B.

An embodiment of the present method will be illustrated below in the order of the above-mentioned course.

Methyleugenol (I) is reacted in water-saturated ether with yellow mercuric oxide and iodine to form an epoxide of the Formula II, B.P. 165°–170° C./15 mm. Hg, yield 51%. The epoxide of the Formula II is condensed with an acetoacetic acid ester to obtain a compound of the Formula III having IR$_\gamma^{KBr}$ of 1725 and 1760 cm.$^{-1}$, and UV $\lambda_{max.}^{CH_3OH}$ of 230 and 278 mμ (log ε:3.64 and 3.25)

The compound of the Formula III may be used, without crystallization, in the subsequent reaction. Sodium salt of the compound (III) is reacted in benzene with 3,4-methylenedioxybenzoyl chloride to obtain a compound of the Formula IV, yield 86%. This compound has a melting point of 122° C. and the molecular formula $C_{23}H_{22}O_8$ and its IR absorption spectrum (KBr) shows existence of γ-lactone, acetyl and benzene-conjugated ketone at 1770, 1720 and 1665 cm.$^{-1}$, respectively, and its UV absorption spectrum shows absorptions at $\lambda_{max.}^{CH_3OH}$ of 230, 278 and 315 m$\mu$ (log $\epsilon$:4.19, 4.13 and 4.13)

The compound IV is subjected to deacetylation reaction using an equimolar amount of $C_2H_5ONa$ to obtain a compound V of the molecular formula $C_{21}H_{20}O_7$, M.P. 159° C., yield 77%, IR.$_\gamma^{KBr}$ 1750 and 1663 cm.$^{-1}$, UV $\lambda_{max.}^{CH_3OH}$ 230, 278 and 315 m$\mu$ (log $\epsilon$:4.23, 4.14 and 4.14)

The compound V is boiled for 20 minutes together with hydrogen chloride-saturated methanol to obtain as a sole product a colorless, needle-like crystalline compound. M.P. 132° C., yield 32%, IR.$_\gamma^{KBr}$ 1710 cm.$^{-1}$, UV $\lambda_{max.}^{CH_3OH}$ 225, 245 and 205 m$\mu$ (log $\epsilon$:4.17, 3.16 and 4.14)

The molecular formula of this compound is decided to be $C_{22}H_{22}O_7$ and, from the results of analysis of its methoxyl groups and from its NMR spectrum [$\delta$ 3.50 (3H.S), 3.59 (3H.S) and 3.85 (3H.S)], the presence of 3 methoxyl groups is confirmed. In view of the points that it shows no absorption in the hydroxyl group zone of its IR absorption spectrum and that even when it is dissolved in an aqueous dilute NaOH solution and is then made acidic, the original substance cannot be recovered any more, it is understood that neither hydroxyl group nor lactone ring is present in the compound. Therefore, the present inventor has inferred that said compound would have the structure VI or VII, assuming that the absorption of IR.$_\gamma^{KBr}$ 1710 cm.$^{-1}$ is the absorption of carbonyl of methyl ester, but no close examination has been made.

The compound represented by the Formula VI or VII is heated to 180° C. together with potassium bisulfate to obtain a compound of the Formula VIII, $C_{21}H_{18}O_6$, M.P. 201° C., yield 54%, IR.$_\gamma^{KBr}$ 1740 cm.$^{-1}$, UV $\lambda_{max.}^{CH_3OH}$ 205, 248, 310 and 345 m$\mu$ (log $\epsilon$:4.22, 4.16, 3.72 and 4.14)

UV absorption spectrum of the compound (VIII) is quite similar to that of $\gamma$-apopicropodophyllin represented by the formula

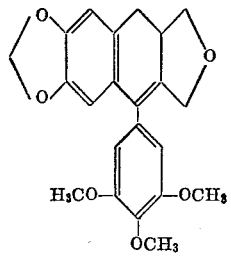

The compound VIII is heated in acetic acid together with such a dehydrogenation agent as lead tetraacetate to obtain a compound of the Formula IX, $C_{21}H_{16}O_6$, M.P. 247° C., yield 35%. The compound IX is obtained in the form of colorless prism-like crystals which emit blue fluorescence by irradiation with ultraviolet ray.

A comparison between the compound IX and Justicidin B shows that the two are completely identical in IR and UV absorption spectra, mixed test and thin layer chromatograph. Further, the two are substantially identical in the results of toxicity test on *Oryzias latipes*.

The intermediate compounds represented by the Formula IV to VIII are novel compounds first synthesized by the present inventor, while the compound represented by the Formula III is a known compound disclosed in "Journal of Chemical Society," 1936, page 725.

In the final step, the dehydrogenation may be effected, for example, at 240° C. under reduced pressure of 0.1 mm. Hg in the presence of other mild dehydrogenation agent such as palladium black.

The thus synthesized Justicidin B and its dihydro compound of the Formula VIII can be formed into fish killers either independently or in admixture with other known components. In practicing the present compounds for fish killers, they are formulated into wettable powders, emulsifiable concentrates, dusts or the like in a diluted concentration according to processes thoroughly known to those skilled in the art, using inactive diluting adjuvants. Since said compounds have synergistic effects on pyrethrin, they may be used in combination with pyrethrin type insecticides.

The following examples illustrate the present invention, but the invention is not limited only to these examples.

EXAMPLE 1

Synthesis methods

First step: Synthesis of methyleugenol oxide II:

53.5 g. of methyleugenol (I), 33 g. of mercuric oxide, yellow and 76.2 g. of iodine were charged into an eggplant type flask. To the flask, 450 ml. of water-saturated ethyl ether (Et$_2$O) was added, and the flask was stoppered and was then shaken for 2 days by means of a shaker. Subsequently, the flask was inclined to take up Et$_2$O solution. The solution was shaken together with a 5% aqueous NaHSO$_3$ solution and then with a 5% aqueous KI solution, was dried over sodium sulfate and was then charged with 56 g. of powdery potassium hydroxide, followed by stirring. After 10 hours' stirring, the flask was inclined to take up Et$_2$O solution. The solution was freed from Et$_2$O distillation and was then subjected to reduced pressure distillation to obtain 30 g. of methyleugenol oxide of the Formula II.

Second step: Synthesis of $\alpha$-acetyl-$\gamma$-(3,4 - dimethoxybenzyl)-$\gamma$-butyrolactone (III):

20 g. of the methyleugenol oxide (II) was added to a sodium salt of ethyl acetoacetate (formed from 18 g. of ethyl acetoacetate and 3 g. of sodium), and the mixture was allowed to stand for 7 days. The mixture was charged with water and was shaken together with ethyl ether, and then the resulting aqueous solution was acidified and was shaken again together with ethyl ether. Even when the Et$_2$O solution was concentrated, the resultant residue deposited no crystals, the concentrate was thoroughly dried and was sent as such to the subsequent reaction, yield 13 g.

Third step: Synthesis of $\alpha$-acetyl-$\alpha$-(3,4-methylenedioxybenzoyl)-$\gamma$-(3,4 - dimethoxybenzyl) - $\gamma$ - butyrolactone (IV):

11.6 g. of the lactone of the Formula III was dissolved in 50 ml. of benzene, and 0.96 g. of sodium was added to the solution. After 24 hours, a solution of 7.70 g. of 3,4-methylenedioxybenzoyl chloride in 50 ml. of benzene was added. 3 hours thereafter, crushed ice was added, and the solution was extracted with benzene to obtain 15 g. of a desired lactone of the Formula IV.

Fourth step: Synthesis of $\alpha$-(3,4-methylenedioxybenzoyl)-$\gamma$-(3,4-dimethoxybenzyl)-$\gamma$-butyrolactone (V):

4.0 g. of the lactone of the Formula IV was dissolved in 50 ml. of benzene containing an equimolar amount of sodium ethylate (EtONa) (EtOH: 0.46 g., Na: 0.23 g.), and the solution was stirred.

After 12 hours, the solution was charged with water, was acidified and was extracted with benzene. Subsequently, benzene was distilled off and the resulting crystalline substance was recrystallized from methyl alcohol to obtain 3.0 g. of colorless needle-like crystalline compound. Elementary analysis for $C_{21}H_{20}O_7$.—Found (percent): C, 66.00; H, 5.25. Calculated (percent): C, 65.61; H, 5.24.

Fifth step: Synthesis of a compound represented by the Formula VI or VII by reaction of the compound of the Formula V with hydrogen chloride-saturated methanol:

1.2 g. of the compound (V) was dissolved in 30 ml. of hydrogen chloride-saturated methanol, and the solution was refluxed over a water bath for 20 minutes.

The reaction liquid was poured on crushed ice, and the resulting white precipitate was extracted with chloroform. From the extract, chloroform was removed by distillation, and the residue was recrystallised from methanol to obtain 400 mg. of a colorless needle-like crystalline compound, M.P. 132° C.

Elementary analysis for $C_{22}H_{22}O_7$.—Found (percent): C, 66.00; H, 5.43. Calculated (percent): C, 66.32; H, 5.57.

Analysis for methoxy group.—Found (percent): 23.26. Calculated (percent): 23.33 (for three methoxy groups).

Sixth step: Synthesis of 6,7-dimethoxy-4-(3′,4′-methylenedioxyphenyl) - 2 - hydroxymethyl - 1,2 - dihydro-3-naphthoic acid lactone (VIII):

400 mg. of the compound obtained in the fifth step was mixed with 800 mg. of acid potassium sulfate ($KHSO_4$). The mixture was heated over an oil bath at 180° C. for 10 minutes, whereby the mixture was colored to brown. The mixture was cooled and was extracted with cloroform, and the chloroform solution was concentrated, was subjected to an alumina column and was eluted with chloroform. Subsequently, a portion emitting blue fluorescence was recovered, and chloroform was removed by distillation. The residue was recrystallized from ethyl acetate to obtain 200 mg. of a compound of the Formula VIII in the form of colorless, needle-like crystals, M.P. 201° C.

Elementary analysis.—Found (percent): C, 68.93; H, 4.61. Calculated (percent): C, 68.84; H, 4.95.

Seventh step: Synthesis of Justicidin B (IX):

100 mg. of the compound (VIII) was dissolved in 5 ml. of acetic acid. To the soltuion, 200 mg. of lead tetraacetate was added, and the mixture was maintained at 75° C. for 15 minutes. Subsequently, the reaction liquid was charged in ice water, and the resulting white precipitate was extracted with chloroform. After drying, the chloroform solution was concentrated to dryness, and the residue was recrystallized from ethyl acetate to obtain 35 mg. of a compound of the Formula IX. From the results of mixed test, IR absorption spectra and UV absorption spectra and thin layer chromatograph, it was confirmed that said compound was completely identical with Justicidin B.

EXAMPLE 2

Toxicity test on fish (1) Test method: Toxicity test was effected with respect to *Oryzias latipes*.

The test was carried out in the following manner:

Test compounds and control compounds were individually dissolved in a small amount of ethanol, and the solution was diluted with water to a given concentration. In this aqueous solution, *Oryzias latipes* were released, and the number of killed fishes was counted after 24 hours and 48 hours.

In the case of Justicidin B, the concentration range was finely divided and its 50% lethal concentrations (TLm) were measured, while in the case of other control compounds, only the presence or absence of killed fishes at concentrations of 10 p.p.m. and 1 p.p.m. was investigated. Further, the test on Justicidin B was effected by charging 1 l. of its aqueous solution into a glass vessel (13 cm. x 7 cm. x 20 cm.) and releasing therein 5 *Oryzias latipes* while the test on other compound was carried out by charging 200 ml. of an aqueous solution thereof into a polyethylene vessel of about 250 cc. in volume and releasing therein 3 *Oryzias latipes*.

(2) Test results:

| Justicidin B | TLm 0.028 [1] | | | TLm 0.025 [2] | | |
|---|---|---|---|---|---|---|
| Synthetic dihydro compound (VIII): | | | | | | |
| 10 p.p.m. | X | X | X | X | X | X |
| 1 p.p.m. | O | O | O | X | X | X |
| Methyl-α-conidendrin: | | | | | | |
| 10 p.p.m. | O | O | O | O | O | O |
| 1 p.p.m. | O | O | O | O | O | O |
| Dehydromethyl-conidendrin: | | | | | | |
| 10 p.p.m. | O | O | O | O | O | O |
| 1 p.p.m. | O | O | O | O | O | O |
| Dehydro-anhydro-picropodophyllin, 1 p.p.m. | O | O | O | O | O | O |

[1] After 24 hours.
[2] After 48 hours.

NOTE.—O=survival fish; X=killed fish.

EXAMPLE 3

Other toxicity tests and synergistic tests (1) Toxicity on mouse and insects:

Mouse: Justicidin A, B mixture—LD 50>300 mg./kg.
Seed beetles (*Callosobruchus chinnensis* Linné), Leafhoppers (*Nephotettix cincticeps* Uhler) and cockroaches: Justicidin A, B mixture—Non-toxic.

(2) Synergistic effects: It was recognized that on pyrethrin, Justicidin B had substantially the same synergistic effects as in the case of sesamin, but on allethrin, it had no synergistic effects.

I claim:

1. Justicidin B [4-(3′,4′-methylenedioxyphenyl)-6,7-dimethoxy-2-hydroxymethyl-3-naphthoic acid lactone] represented by the formula

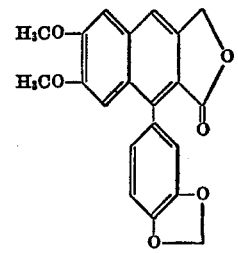

(IX)

2. Dihydro Justicidin B [4-(3′,4′-methylenedioxyphenyl) - 6,7 - dimethoxy - 2-hydroxymethyl - 1,2-dihydro-3-naphthoic acid lactone] represented by the formula

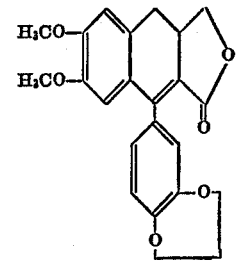

(VIII)

References Cited

Sohrecker et al.: "Journ. Amer. Chem. Soc.," vol. 74 (1952), pp. 56–75.

ALEX MAZEL, Primary Examiner

J. H. TURNIPSEED, Assistant Examiner

U.S. Cl. X.R.

260—343.6, 348; 424—282